United States Patent Office 3,478,044
Patented Nov. 11, 1969

3,478,044
HERBICIDAL BENZOTHIADIAZOLES AND OXYGEN AND SELENIUM ANALOGUES
Robert S. Slott, Berkeley, Edward R. Bell, Walnut Creek, and Kurt H. G. Pilgram, Modesto, Calif., assignors to Shell Oil Company, New York, N.Y., a corporation of Delaware
No Drawing. Filed Dec. 9, 1966, Ser. No. 600,371
Int. Cl. C07d 99/00
U.S. Cl. 260—298                                   6 Claims

ABSTRACT OF THE DISCLOSURE

Novel herbicidal 2,1,3 benzothiadiazoles substituted by at least one of cyano and thiocarbamoyl, and their oxygen and selenium analogues.

---

This invention relates to novel compounds useful in destroying and/or preventing growth of unwanted plants.

These novel herbicidal compounds are represented by the generic formula:

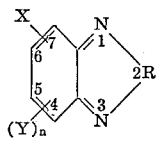

wherein R is oxygen, sulfur or selenium, X is cyano (—CN) or thiocarbamoyl (—C(S)NH$_2$), $n$ is a whole number from zero to three, and Y is middle halogen (i.e., bromine or chlorine), nitro (—NO$_2$), lower alkyl, amino (—NH$_2$), cyano or thiocarbamoyl.

In these compounds, any alkyl substituent preferably contains no more than two carbon atoms.

In these compounds, highest herbicidal activity occurs when the substituent, X, is bonded to one of the carbon atoms in the 4- and 7-positions on the ring. Within this subgenus, two classes appear to exhibit the highest activity:

(a) The class wherein $n$ is 1 and Y is cyano or thiocarbamoyl;
(b) The class wherein $n$ is 2 and one Y is methyl, the other Y being cyano or thiocarbamoyl.

Typical species, illustrating the genus of herbicidal compounds of this invention, are set out in the examples presented hereinafter showing preparation and herbicidal screening of those species.

The compounds of the invention wherein X is cyano are readily prepared by mixing the corresponding bromo benzothiadiazole, benzofurazan or benzoselenadiazole with the theoretical amount of cuprous cyanide in a highly polar aprotic solvent, such as dimethylformamide, pyridine or dimethylsulfoxide, and heating the resulting mixture. The compounds wherein $n$ is 1 or more, and one or more of Y is cyano, can be prepared in a like manner from the corresponding substituted benzothiadiazole, benzofurazan or benzoselenadiazole precursors. The manner in which the conversion is carried out is illustrated in the examples set out hereinafter.

The compounds of the invention wherein X is thiocarbamoyl are readily prepared by reacting the appropriate compound of the invention wherein X is cyano with hydrogen sulfide (to completion of reaction) in the presence of ammonia or a base such as diethanolamine. Where ammonia is employed, a lower alkanol such as methanol or ethanol is a suitable solvent; wherein diethanolamine or similar base is employed, dimethylformamide is a suitable solvent. Where $n$ is one or more, and one or more of Y is thiocarbamoyl, the compound can be prepared in a like manner from the corresponding cyano-substituted benzothiadiazole, benzofurazan or benzoselenadiazole precursor. The manner in which this conversion is carried out also is illustrated in the following examples.

In these examples, "parts" means parts by weight unless otherwise expressly indicated, and parts by weight bear the same relationship to parts by volume as does the kilogram to the liter.

Example I.—Preparation of 2,1,3-benzothiadiazole-4,7-dicarbonitrile 10 parts of 4,7-dibromo-2,1,3-benzothiadiazole was mixed with 6.1 parts of cuprous cyanide and the mixture stirred into 100 parts by volume of dimethylformamide. The mixture was stirred for 19 hours at reflux temperature (150–155° C.). It then was cooled and filtered to remove solid material that had formed. The filtrate was mixed with 150 parts by volume of water. A precipitate formed and was removed by filtration. The precipitated material was dissolved in concentrated ammonium hydroxide and the solution extracted with benzene. The product was obtained as the solid matter remaining following the extraction. The product sublimes. It was identified by elemental analysis as 2,1,3-benzothiadiazole-4,7-dicarbonitrile, which melts at 187–189° C. (sealed tube), when recrystallized from methyl ethyl ketone.

Analysis (percent by weight). Calculated: C, 51.5; H, 1.1; N, 30.1. Found: C, 51.4; H, 1.1; N, 29.0.

The identity of the product was confirmed by infra-red and mass spectrum analysis.

Example II.—Preparation of 4,7-benzofurazandicarbonitrile 45 parts of 4,7-dibromobenzofurazan was dissolved in 400 parts by volume of dimethylformamide. 30 parts of cuprous cyanide was added and with constant stirring the mixture wash eated to 150–155° C. and held there, total time: 1.5 hours. The solvent then was stripped off under reduced pressure, and the residue was extracted with xylene. The xylene extract was evaporated to leave 13.5 parts of crude product, which on crystallization from ethanol gave 12 parts of 4,7-benzofurazandicarbonitrile as brown crystals melting at 185–188° C. The identity of the product was established by elemental analysis:

Calculated: N, 38.8; Br, 0. Found: N, 38.9; Br, less than 0.2.

The identity of the product was confirmed by its infrared spectrum and by gas-liquid chromatography procedure.

Example III.—Preparation of 5-chloro-4-carbonitrile-2,1,3-benzothiadiazole 20 parts of 4-bromo-5-chloro-2,1,3-benzothiadiazole, 7.2 parts of cuprous cyanide and 200 parts by volume of dimethylformamide were placed in a reactor and the mixture stirred and heated at reflux (approximately 153° C.) for approximately 3.5 hours. The solvent then was stripped off under reduced pressure. The residue was taken up in 100 parts by volume of concentrated hydrochloric acid and 100 parts by volume of benzene. 25 parts by volume of 30% hydrogen peroxide in water was added dropwise to the stirred mixture over a period of 45 minutes, the mixtures being maintained at 40° C. The mixture was stirred for an additional 30 minutes after the hydrogen peroxide had all been added. The mixture then was filtered and the filtrate phase-separated. The filter cake and the aqueous phase were each extracted with benzene, the benzene solutions combined, dried, filtered and benzene removed to yield 17 parts of crude product. Recrystallization from methanol yielded 8 parts of 5-chloro - 4 - carbonitrile - 2,1,3 - benzothiadiazole, colorless crystals melting at 172–175° C. The identity of the product was established by elemental analysis, and infra-red spectrum analysis.

Example IV.—Preparation of 4,7-di(thiocarbamoyl)-2,1,3-benzothiadiazole 20 parts of 2,1,3-benzothiadiazole-4,7 - dicarbonitrile and 1500 parts by volume of methanol were introduced into a reactor. Anhydrous ammonia was bubbled into the stirred mixture for 30 minutes. Then hydrogen sulfide and ammonia were bubbled into the stirred mixture for an additional 3 hours. The mixture spontaneously heated to 50° C. The mixture then was cooled in an ice bath and was filtered. 17 parts of a maroon colored solid product was obtained, melting at 259–263° C. with decomposition. It was identified by elemental analysis:

Calculated: N, 22.0; S, 37.8; C, 37.8; H, 2.4. Found: N, 22.2; S, 36.1; C, 38.8; H, 2.1.

The identity was confirmed by infra-red spectrum analysis.

4,7 - di(thiocarbamoyl) - 2,1,3 - benzothiadiazole also was prepared in a similar manner employing diethanolamine (one mole per mole of dicarbonitrile reactant) instead of ammonia, and dimethylformamide as solvent. The product was a brick-red solid melting at 261–262° C. with decomposition. It, too, was identified by elemental and infra-red spectrum analysis.

Example V.—Preparation of 5-methyl-4,7-di(thiocarbamoyl)-2,1,3-benzothiadiazole

In a manner similar to that described in Example I, 5-methyl-4,7 - dicarbonitrile - 2,1,3 - benzothiadiazole was prepared from 5-methyl-4,7-dibromo-2,1,3-benzothiadiazole.

2 parts of 5 - methyl - 4,7 - dicarbonitrile - 2,1,3-benzothiadiazole and 150 parts by volume of ethanol were placed in a reactor, and ammonia and hydrogen sulfide were bubbled into the stirred mixture for 45 minutes. The mixture then was cooled in an ice bath and filtered. 2 parts of red-brown colored solid, melting at 235–238° C., was obtained. The product was identified as 5-methyl-4,7-di(thiocarbamoyl)-2,1,3 - benzothiadiazole by elemental analysis:

Calculated: N, 23.9; S, 27.3. Found: N, 23.5; S, 26.9.

The identity was confirmed by infra-red spectrum analysis.

By similar procedures other species of the compounds of this invention were prepared.

The following compounds of the invention were tested to ascertain their effectiveness as herbicides, the compounds being identified in terms of the following formula:

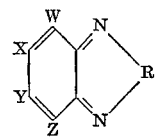

| Compound | R | W | X | Y | Z |
|---|---|---|---|---|---|
| A | Sulfur | Cyano | H | H | Cyano |
| B | do | do | do | H | H |
| C | do | Thiocarbamoyl | H | H | Thiocarbamoyl |
| D | Oxygen | Cyano | H | H | Cyano |
| E | Sulfur | do | Chlorine | H | H |
| F | do | do | do | Cyano | H | Cyano |
| G | do | do | do | H | Cyano | H |
| H | do | Thiocarbamoyl | H | Thiocarbamoyl | H |
| I | do | Cyano | Nitro | H | Bromine |
| J | do | do | Methyl | H | Cyano |
| K | do | do | do | do | H | Thiocarbamoyl |
| L | do | do | do | Cyano | H |
| M | do | do | do | H | H | Nitro |
| N | do | H | do | Cyano | Cyano | H |
| O | Selenium | Cyano | H | H | Cyano |

Example VI

The pre-emergence herbicidal activity of compounds of the invention was evaluated by planting seeds of test plants in soil treated with the test compounds at the rate of 10 pounds per acre. Seeds of watergrass and cress were planted in treated soil and the planted soil held under controlled conditions of temperature, moisture and light for 13 to 14 days. The amount of germination then was noted, and the effectiveness of the test compound rated on the basis of a 0 to 9 scale, 0 rating indicating no effect, 9 indicating death of seedlings or no germination. The results are summarized in Table I. The post-emergence activity of compounds of the invention was evaluated by spraying 10-day old pigweed plants and 7-day old crabgrass plants with a liquid formulation of the test compound at the rate of 10 pounds of test compound per acre. The sprayed plants then were held under controlled conditions of temperature, moisture and light for 10–11 days. The effect of the test chemical then was evaluated visually, the results being rated on a 0 to 9 scale, 0 rating indicating no effect, 9 rating indicating complete kill of the plants. The results are also summarized in Table I.

TABLE I

| | Pre-emergence | | Post-emergence | |
|---|---|---|---|---|
| | Water-grass | Cress | Crabgrass | Pigweed |
| Compound: | | | | |
| A | 9 | 9 | 9 | 9 |
| B | 9 | 9 | 3 | 1 |
| C | 9 | 9 | 9 | 9 |
| D | 9 | 9 | 9 | 9 |
| E | 8 | 9 | 9 | 9 |
| F | 9 | 9 | 9 | 9 |
| G | 9 | 9 | 9 | 9 |
| H | 9 | 9 | 9 | 9 |
| I | 9 | 9 | 7 | 9 |
| J | 9 | 9 | 9 | 9 |
| K | 9 | 9 | 9 | 9 |
| L | 9 | 9 | 9 | 9 |
| M | 9 | 9 | 6 | 9 |
| N | 8 | 9 | 6 | 7 |
| O | 8 | 9 | 7 | 5 |

Other compounds of the invention which have been found to be active in these tests include:

5,7-dichloro-2,1,3-benzothiadiazole-4-carbonitrile
4-nitro-2,1,3-benzothiadiazole-5,7-dicarbonitrile
4,7-di(thiocarbamoyl)benzofurazan
5-amino-2,1,3-benzothiadiazole-4,7-dicarbonitrile
4,7-di(thiocarbamoyl)-5,6-dimethyl - 2,1,3 - benzothiadiazole
5,6-dimethyl-2,1,3-benzothiadiazole-4,7-dicarbonitrile Example VII The pre- and post-emergence herbicide activity of compounds of the invention was further evaluated by spraying seeded oil, and growing plants respectively, with a 1:1 acetone-water formulation of the test compound, then holding the sprayed soil or plants under controlled conditions for 10–11 days, then ascertaining the effect of the test compound in each case. The seeded soil and plants were held in small pots, placed side-by-side. The spraying was so conducted that the dosage varied logarithmically over a series of the pots. The results in each case were reported in terms of the $LD_{95}$ dosage (dosage in pounds per acre to give control 95% control of the test plant). The plants used, the test compounds used and the $LD_{95}$ dosages for each test plant/test compound combination are summarized in Table II and III.

TABLE II

| | Per-emergence application | | | | | |
|---|---|---|---|---|---|---|
| | Rye-grass | Cheat-grass | Crab-grass | Dock | Pigweed | Mustard |
| Compound: | | | | | | |
| A | >10 | 2.6 | 1.1 | 1.8 | 0.3 | 2.3 |
| B | 5.5 | 2.5 | 8.5 | 2.5 | 5.0 | 3.5 |
| C | >10 | 10.0 | 1.3 | 3.5 | 0.4 | 5.5 |
| D | 10.0 | 1.3 | 3.0 | 3.5 | 1.7 | 7.5 |
| G | >2 | >2 | 1.4 | >2 | 1.4 | >2 |
| J | >2 | >2 | 1.5 | >2 | 1.1 | >2 |
| K | >2 | >2 | 2.0 | >2 | 1.7 | >2 |
| L | 2.5 | 2.0 | 0.9 | 1.7 | 0.9 | 4.5 |

TABLE III

| | Post-emergence application | | | | |
|---|---|---|---|---|---|
| | Wild Oats | Water-grass | Crab-grass | Fiddle-neck | Field cress |
| Compound: | | | | | |
| A | >10 | 1.0 | 0.3 | 0.5 | 1.1 |
| B | >10 | >10 | >10 | >10 | >10 |
| C | >10 | 7.5 | 1.0 | 3.0 | 6.0 |
| D | >10 | 1.5 | 0.2 | 0.4 | 0.6 |
| G | 2 | 1.2 | 1.0 | 2 | 1.8 |
| J | 2 | 1.2 | 0.5 | 2 | 2.0 |
| K | 2 | 2 | 1.4 | 2 | 2 |
| L | 2.0 | 0.9 | 0.4 | 1.7 | 1.7 |

It is evident from the results of all of these tests that compounds of the invention are generically powerful broad-spectrum herbicides, whether applied pre-emergence or post-emergence.

The compounds of this invention are in general solids of very low volatility that are rather insoluble in water and the common organic solvents used in applying herbicides. Consequently, it will be found that compounds of the invention are most readily and effectively applied as herbicides formulated as wettable powders, or as granules for application to soil. Thus, the compound can be adsorbed or absorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granuels designed to be broadcast or to be worked into the soil. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal compounds set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, alpha-methylbenzyl 3-hydroxycrotonate dimethyl phosphate and 3-hydroxy-N,N-dimethyl crotonamide dimethyl phosphate, rotenone and pyrethrum, and fungicides, such as copper compounds, ferbam, captan, and the like, may be incorporated in the compositions. Further, if desired, the hebicidal compositions may contain fertilizers, trace metals or the like and when applied directly to the soil may additionally contain nematocides, soil conditioners, other plant regulators, such as naphthalene acetic acid, 2,4-dichlorophenoxyacetic acid and the like, and/or herbicides of different properties.

Because the compounds of the invention are not very volatile, and are rather insoluble in water, they tend to remain in that part of the soil into which they are introduced, even heavy leaching with water tending to move them only slightly through soil.

Consequently, by appropriate selection of the part of the soil into which they are introduced, relative to the seeds of wanted plants and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under those conditions. By introducing the herbicide only into the top one-quarter inch of the soil, and avoiding excessive watering, germination of the weed seeds can be prevented, while germination of the crop seeds will not be effected. Thus, even those herbicides of this invention that are not very selective in their action can be used to selectively remove the weeds from cereal grains or other crops. Of course, if complete kill of all plants in a given portion of soil is desired, it is necessary only to introduce one or more of the herbicides throughout that portion of soil.

We claim as our invention:

1. A compound of the formula:

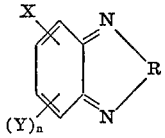

wherein R is oxygen, sulfur or selenium, X is cyano or thiocarbamoyl, $n$ is a whole number from zero to three and Y is middle halogen, nitro, lower alkyl, amino, cyano or thiocarbamoyl.

2. A compound according to claim 1 wherein X is bonded to a carbon atom in either the 4- or 7-position of the ring, $n$ is 1 and Y is cyano or thiocarbamoyl.

3. A compound according to claim 1 wherein X is bonded to a carbon atom in either the 4- or 7-position of the ring, $n$ is 2, one Y is methyl, the other Y being cyano or thiocarbamoyl.

4. A compound according to claim 2 in which X and Y both are cyano.

5. A compound according to claim 4 in which X is bonded to the carbon atom at the 4-position of the ring, and Y is bonded to the carbon atom at the 7-position of the ring.

6. A compound according to claim 2 in which X and Y both are thiocarbamoyl.

References Cited

UNITED STATES PATENTS 3,279,909  10/1966  Daams et al. _____ 260—304
3,337,572   8/1967  Kilsheimer et al. ____ 260—307

ALEX MAZEL, Primary Examiner

R. J. GALLAGHER, Assistant Examiner

U.S. Cl. X.R.

71—90, 92; 260—304, 307